(No Model.) 2 Sheets—Sheet 1.

J. J. HOGAN.
FLANGE AND COLLAR COUPLING.

No. 448,717. Patented Mar. 24, 1891.

Attest:
L. Lee
F. C. Fischer

Inventor.
J. J. Hogan, per
Crane & Miller, Attys.

(No Model.) 2 Sheets—Sheet 2.

J. J. HOGAN.
FLANGE AND COLLAR COUPLING.

No. 448,717. Patented Mar. 24, 1891.

UNITED STATES PATENT OFFICE.

JOHN J. HOGAN, OF NEW YORK, N. Y., ASSIGNOR TO THE HOGAN ENGINEERING COMPANY, OF NEW YORK.

FLANGE-AND-COLLAR COUPLING.

SPECIFICATION forming part of Letters Patent No. 448,717, dated March 24, 1891.

Application filed November 18, 1889. Serial No. 330,820. (No model.)

*To all whom it may concern:*

Be it known that I, JOHN J. HOGAN, a citizen of the United States, residing in the city, county, and State of New York, have invented certain new and useful Improvements in Flange-and-Collar Couplings, fully described and represented in the following specification and the accompanying drawings, forming a part of the same.
The object of this invention is to connect lead pipes to one another and to various fittings without the use of wiped joints, and to thus save much delay and expense in connecting a system of such pipes.
In the present construction a flange is bent upon the end of the pipe, a ring with cylindrical bore and conical exterior is applied to the pipe behind the flange, and an external sleeve fitted to the conical ring is drawn toward the end of the pipe to press the flange against a similar flange upon another pipe or against a seat upon a fitting. The rings are made either solid or, if divided, formed with butt-joints, so that when clamped by the external sleeve they may not compress the pipe, and to prevent the pressure upon the flanges from forcing them out of the joint into the pipe the flanges are preferably bent in some manner where in contact with the inner ends of the rings. Such result may be effected by making the flange wide enough to bend its margin over the outer side of the ring; but the adjacent ends of the rings are preferably rabbeted or beveled, so as to bend the pipe-flanges from a right angle to lock it between the ends of the rings, and thus prevent the flange from being crowded out of the joint. Where a pipe is connected with a cock or thimble, such cock or thimble could be constructed with the rabbet to co-operate with the ring applied behind the flange upon the pipe.

I have employed the term "opposed fitting" herein to designate such parts of the coupling as are fitted together in order to perform their functions effectively. Thus where the flanges upon two abutting pipe ends are clamped together to form a tight joint I consider such pipe ends fittings, as it is neces- sary that they be fitted to each other in order to serve the purpose for which they are intended.

My improvements will be understood by reference to the annexed drawings, in which—

Figure 1:
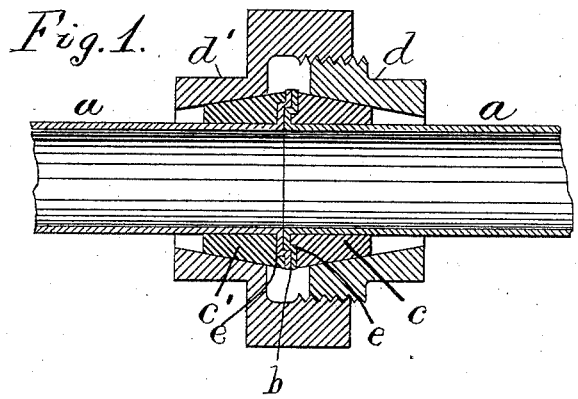
Figure 2:
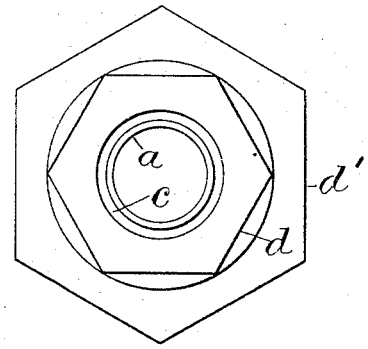
Figure 3:
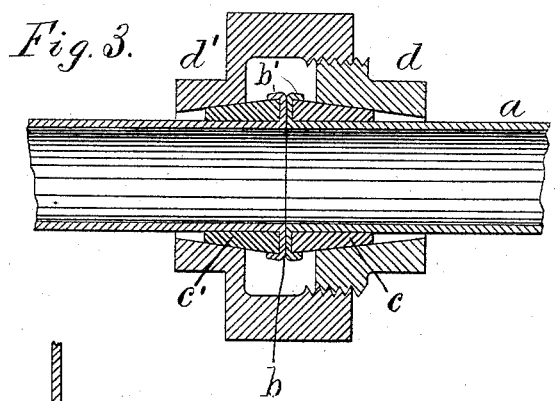
Figures 4, 5:
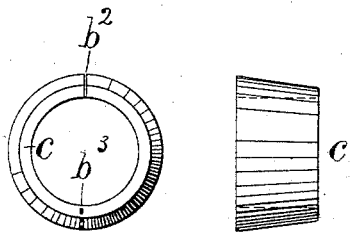
Figure 6:
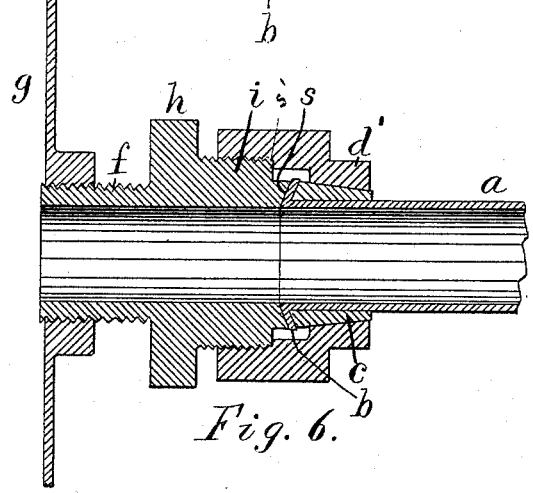
Figure 7:
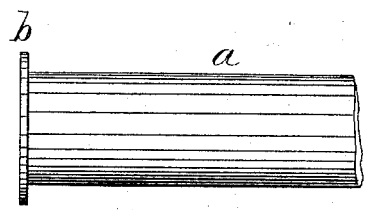
Figure 8:
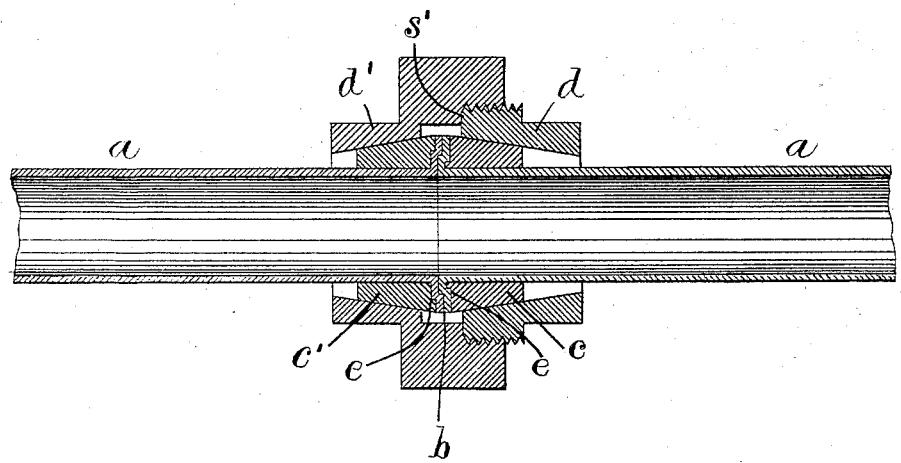

Figure 1 is a longitudinal section of a pipe-joint formed of rabbeted rings. Fig. 2 is an end view of the coupling shown in Fig. 1. Fig. 3 is a sectional view of a coupling having the rims of the flanges bent over the outer side of the rings. Fig. 4 is an edge view of one of such rings; Fig. 5, a side view of the same. Fig. 6 is a section of a boiler-connection formed with my improvement, the collar and its opposed nozzle being beveled to lock the flange in the joint. Fig. 7 is a side view of the pipe end with its flange as first bent; and Fig. 8 is a section like Fig. 1, with the stop applied to the coupling-sleeve.

$a$ are the pipe ends; $b$, the flanges bent at first at right angles upon the ends of the same; $c$ and $c'$, rings which are slipped over the ends of the pipe, if necessary, before such flanges are bent; $d$, a sleeve with outside thread fitted to one of the rings, and $d'$ a sleeve with inside thread fitted to the rings $c'$ and to the thread upon the sleeve $d$. Both of the sleeves are provided, as shown in Fig. 2, with hexagon seats adapted to receive a wrench, and the screwing of the sleeves together serves to draw the ends of the rings toward one another and to clamp them rigidly upon the flanges $b$.

In Fig. 1 rabbets $e$ are shown formed upon the opposed ends of the rings adjacent to the flanges, and the flanges are shown bent by the pressure of such rings into a corresponding shape. A strong pressure upon the flanges would tend to crowd them from the joint between the ends of the rings, and, owing to the softness of the lead pipe, to force them within its bore, which would obstruct the channel-way in the pipe. By bending the flange or flanges from a right angle where in contact with the end of the ring the flange is locked in the joint to a greater or less degree, and is thus prevented from crowding into the pipe.

In Fig. 3 the adjacent ends of the rings are shown flat and the rims of the flanges bent at $b'$ over the outside of such rings to hold the same from crowding inward, the same as the rabbets $e$.

The ring, as shown in Fig. 5, may be divided, as by a narrow cut $b^2$, or it may be made in two pieces, as by division in the dotted line $b^3$, in which latter case it may be readily applied to the pipe end after the flange is bent. In any case it is preferable that the joints of the ring should butt against one another to prevent the crushing of the pipe when the sleeves are applied and operate upon the outside of the ring.

Fig. 6 illustrates the connection of a single pipe end with a boiler-coupling. $f$ is the threaded end of the coupling fitted to the boiler, (only a portion of which is shown at $g$.) $h$ is the hexagonal seat upon the coupling, and $i$ a threaded nozzle adapted to operate with the sleeve $d'$ in drawing the flange $b$ toward the nozzle $i$. The seat $s$, formed upon the end of such nozzle to fit the flange, is shown of dish shape, and the end of the ring opposed to the same is beveled backward in correspondence with such seat. Such form for the ring and seat operates to bend the flange from a right angle within the joint and to lock the flange upon the end of the ring in a manner analogous to that shown in Fig. 3, although not so positive.

Owing to the softness of the material composing the pipes and flanges, the latter are liable to be thinned and cut by the corners of the rings $c$ and $c'$, and even separated entirely from the pipes, if the collars are forced together farther after a tight joint is effected between a flange $b$ and an opposed fitting, and I therefore provide a shoulder or stop $s'$ to check the movement of the sleeve at the desired point. The latter construction is shown in Fig. 8, in which the sleeve $d'$, (shown in Fig. 6,) is represented with the stop $s'$ and screwed upon a sleeve $d$, similar to that shown in Fig. 1, to couple the flanged ends of two pipes together.

By my construction a system of lead pipes with all their cocks, fittings, and connections can be put up without the use of fire and with greater rapidity than wiped joints can be made, while the joints formed by my invention may be detached, repaired, or replaced with much greater rapidity than joints formed with melted solder. Thus, when a section of lead pipe is burst by freezing a short piece may be cut out and a piece inserted with entire ease by the use of my improvement, and without disturbing any of the adjacent connections.

I am aware that sleeves with conical bore have been applied outside the flaring ends of lead pipes to draw them together upon an internal connecting-bush having tapering ends; but in such construction the pipe ends themselves are flared instead of flanged, and the joint between the pipes is made by the pressing of the flared portion upon the internal bush. In my construction the pipe is flanged and not flared, and the joint is not made at all inside the pipe, but at the face of the flange, which is bent at its end, and as the split rings $c$ are formed with cylindrical bore they produce no tendency to crush the pipe inward, and no re-enforcement is therefore required inside the pipe. In my construction the parts of the coupling are applied wholly outside of the pipe, and my invention is limited to pipes having flanges bent upon their ends and the joint formed at the face of such flange and not inside the bore of the pipe.

Having thus set forth my invention, what I claim herein is—

1. In a pipe-coupling, the combination, with a flange bent abruptly outward upon the end of the pipe, of a ring having cylindrical bore and conical exterior applied to the exterior of the pipe behind the flange and a coupling-sleeve fitted to the conical exterior of the said ring and operated to press the flange against an opposed fitting, as and for the purpose set forth.

2. In a pipe-coupling, the combination, with a flange bent abruptly outward upon the end of the pipe, of a solid ring having cylindrical bore and conical exterior applied to the exterior of the pipe behind the flange and a coupling-sleeve fitted to the conical exterior of the said ring and operated to press the flange against an opposed fitting, as and for the purpose set forth.

3. In a pipe-coupling, the combination, with a flange bent abruptly outward upon the end of the pipe, of a solid ring having cylindrical bore and conical exterior applied to the exterior of the pipe behind the flange, a coupling-sleeve fitted to the outside of such conical ring and provided with an internal screw-thread, an opposed fitting adapted to receive the outer face of the flange, a screw-thread to fit the interior of such sleeve, and a shoulder or stop to limit the movement of the sleeve, as and for the purpose set forth.

In testimony whereof I have hereunto set my hand in the presence of two subscribing witnesses.

JOHN J. HOGAN.

Witnesses:
C. E. CADY,
THOS. S. CRANE.